(12) United States Patent
Haigh-Hutchinson

(10) Patent No.: US 8,834,245 B2
(45) Date of Patent: Sep. 16, 2014

(54) SYSTEM AND METHOD FOR LOCK ON TARGET TRACKING WITH FREE TARGETING CAPABILITY

(75) Inventors: Mark Haigh-Hutchinson, Austin, TX (US); Melanie Haigh-Hutchinson, legal representative, Austin, TX (US)

(73) Assignee: Nintendo Co., Ltd., Kyoto (JP)

( * ) Notice: Subject to any disclaimer, the term of this patent is extended or adjusted under 35 U.S.C. 154(b) by 982 days.

(21) Appl. No.: 12/222,873

(22) Filed: Aug. 18, 2008

(65) Prior Publication Data

US 2009/0181736 A1  Jul. 16, 2009

Related U.S. Application Data

(60) Provisional application No. 60/935,531, filed on Aug. 17, 2007.

(51) Int. Cl.
*A63F 9/24* (2006.01)
(52) U.S. Cl.
USPC .................................. 463/2; 463/31
(58) Field of Classification Search
USPC .................. 463/1, 2, 30, 36, 42, 49
See application file for complete search history.

(56) References Cited

U.S. PATENT DOCUMENTS

| | | | |
|---|---|---|---|
| 4,720,703 A | 1/1988 | Schnarel, Jr. et al. | |
| 5,075,673 A | 12/1991 | Yanker | |
| 6,097,371 A | 8/2000 | Siddiqui et al. | |
| 6,097,387 A | 8/2000 | Sciammarella et al. | |
| 6,139,433 A * | 10/2000 | Miyamoto et al. | 463/32 |
| 6,139,434 A * | 10/2000 | Miyamoto et al. | 463/32 |
| 6,155,926 A * | 12/2000 | Miyamoto et al. | 463/32 |
| 6,165,073 A * | 12/2000 | Miyamoto et al. | 463/32 |
| 6,241,609 B1 | 6/2001 | Rutgers | |
| 6,259,431 B1 | 7/2001 | Futatsugi et al. | |
| 6,267,673 B1 * | 7/2001 | Miyamoto et al. | 463/31 |
| 6,267,674 B1 * | 7/2001 | Kondo et al. | 463/32 |
| 6,283,857 B1 * | 9/2001 | Miyamoto et al. | 463/31 |
| 6,314,426 B1 | 11/2001 | Martin et al. | |
| 6,331,146 B1 * | 12/2001 | Miyamoto et al. | 463/32 |
| 6,354,944 B1 | 3/2002 | Takahashi et al. | |
| 6,454,652 B2 * | 9/2002 | Miyamoto et al. | 463/31 |

(Continued)

FOREIGN PATENT DOCUMENTS

JP  7-116343  5/1995

OTHER PUBLICATIONS

"The Godfather: Blackhand Edition Review—IGN" written by Bozon, published on or before Mar. 16, 2007, accessible and printed from URL<http://www.ign.com/articles/2007/03/16/the-godfather-blackhand-edition-review>, 3 pages.*

(Continued)

*Primary Examiner* — William Brewster
*Assistant Examiner* — Jason Skaarup
(74) *Attorney, Agent, or Firm* — Nixon & Vanderhye, P.C.

(57) ABSTRACT

An example video game includes a virtual game world including a video game character movable within the virtual game world and one or more targets. A first target in the virtual game world can be locked onto so that the first target remains substantially at the center of a field of view of the game character within the virtual game world. A reticle may be moved to target one or more second targets in the virtual game world while the first target remains locked onto.

21 Claims, 14 Drawing Sheets
(2 of 14 Drawing Sheet(s) Filed in Color)

(56) References Cited

U.S. PATENT DOCUMENTS

| | | | |
|---|---|---|---|
| 6,491,585 B1* | 12/2002 | Miyamoto et al. | 463/33 |
| 6,500,069 B1 | 12/2002 | Ohba et al. | |
| 6,626,760 B1 | 9/2003 | Miyamoto et al. | |
| 6,835,136 B2 | 12/2004 | Kitao | |
| 6,972,776 B2 | 12/2005 | Davis et al. | |
| 7,071,919 B2 | 7/2006 | Hinckley et al. | |
| 7,470,195 B1* | 12/2008 | Baldwin et al. | 463/33 |
| 2003/0169280 A1 | 9/2003 | Hsieh | |
| 2004/0110560 A1 | 6/2004 | Aonuma | |
| 2004/0224760 A1 | 11/2004 | Miyamoto et al. | |
| 2005/0049047 A1 | 3/2005 | Kitao | |
| 2006/0048073 A1 | 3/2006 | Jarrett et al. | |
| 2006/0084509 A1* | 4/2006 | Novak et al. | 463/49 |
| 2006/0094503 A1* | 5/2006 | Ajioka et al. | 463/32 |
| 2006/0246968 A1* | 11/2006 | Dyke-Wells | 463/1 |
| 2007/0097150 A1 | 5/2007 | Ivashin et al. | |
| 2007/0155492 A1 | 7/2007 | Goden et al. | |
| 2007/0270215 A1* | 11/2007 | Miyamoto et al. | 463/32 |
| 2007/0298881 A1 | 12/2007 | Kawamura et al. | |
| 2008/0070684 A1* | 3/2008 | Haigh-Hutchinson | 463/32 |

OTHER PUBLICATIONS

"The Godfather Blackhand Edition—WII—Review | GameZone" written by jkdmedia, published on or before Mar. 19, 2007, accessible and printed from URL<http://www.gamezone.com/reviews/2007/03/19/the_godfather_blackhand_edition>, 4 pages.*

U.S. Appl. No. 11/531,961, to Haigh-Hutchinson, filed Sep. 14, 2006.

Zeleznik, Robert, et al., "UniCam—2D Gestural Camera Controls for 3D Environments," Proceedings of ACM I3D'99 , 1999 Symposium on Interactive 3D Graphics, Atlanta, GA, USA, pp. 169-173 (1999).

McKenna, Michael, "Interactive Viewpoint Control and Three-Dimensional Operations," Proceedings of the 1992 Symposium on Interactive 3D graphics, 1992 ACM, pp. 53-56, Association for Computing Machinery, Cambridge MA (1992).

Mohageg, Mike, et al., A User Interface for Accessing 3D Content on the World Wide Web, CHI 96 Vancouver, BC Canada, pp. 466-472 (Apr. 13-18, 1996).

Cozic, Laurent, et al., "Intuitive Interaction and Expressive Cinematography in Video Games," Theory and Practice of Computer Graphics 2004 (TPCG 2004), Birmingham, UK. IEEE Computer Society 2004, pp. 135-142 (Jun. 8-10, 2004).

MacKinlay, Jock D., et al., "Rapid Controlled Movement Through a Virtual 3D Workspace," Computer Graphics, vol. 24, No. 4, pp. 171-176 (Aug. 1990).

Hinckley, K., "Input Technologies and Techniques," in Handbook of Human-Computer Interaction ed. by A. Sears & J. Jacko, pp. 1-65 (2002).

* cited by examiner

NON-LIMITING
EXAMPLE GAME SYSTEM

NON-LIMITING
EXAMPLE CONTROLLER

NON-LIMITING
EXAMPLE CONTROLLER

SYSTEM AND METHOD FOR LOCK ON TARGET TRACKING WITH FREE TARGETING CAPABILITY

CROSS-REFERENCE TO RELATED APPLICATION

This application claims priority to U.S. provisional application no. 60/935,531, filed Aug. 17, 2007, the contents of which are incorporated herein in their entirety.

BACKGROUND AND SUMMARY

The methods and apparatus herein generally relate to a targeting function for use in a video game environment. More specifically, the methods and apparatus herein relate to lock-on targeting of a primary target within a video game environment with the capability to freely select secondary targets.

There are often times in life when people aren't focused solely on a single object in their immediate field of view. The world is full of clutter and activity, but, fortunately, people are able to keep track of a multitude of objects at once. For example, when walking down the street, people must keep track of fixed objects and other pedestrians. Fortunately, once set in motion, feet generally move autonomously, and a person can direct more conscious attention at the world around them. A walker does not usually have to consciously will each foot to move forward, and direct his or her attention to the ground at all times to avoid obstacles.

Or, for example, if someone is following a friend in a car, in addition to keeping track of the leader, the follower must also be aware of surrounding traffic, traffic signals, and other potential hazards. In a competitive environment, such as, for example, basketball, a defensive player may need to focus on a player holding a ball, but maintain an awareness of the other offensive players as well, so that a quick pass does not result in an easy score. While maneuvering during driving and certain aspects of basketball defense may not be inherent autonomous abilities, they can, with practice, become such second nature that they seem that way.

While these examples all describe skills that people have, or can acquire, in real life, these same skills are often harder to replicate in a virtual world. The level and capabilities of technology can easily present a limiting factor to the experience available in a game. For example, vision ranges are often limited by display screens (e.g. size, resolution, etc.), and focal control is often limited by where a player has directed a game character's attention. Even with unlimited practice, a player may be constrained by a game's technology, since the game does not "learn" in the sense that a human does, and the player may not be able to achieve abilities beyond a certain level due to technological limitations.

As games, and the controllers for games, grow more sophisticated, however, greater degrees of freedom may be achievable, and new "abilities" may be learnable through practice. In effect, the games become more able to simulate skills that a person could learn (or already knows) in real life.

Many video games have been produced in 3D environments to give an added sense of depth and reality. Players can generally move with freedom within the environment, look around, and, for example, in action games, target and attack various objects. Often times the player is faced with a multitude of enemies at once, making rapid targeting and attacking a must-learn skill for a player. Of course, as the environment grows more complex (e.g. has additional obstacles, narrow halls, etc.) the player may have a harder time keeping track of targets. Additionally, even if the player focuses attention on a target to destroy, the player may desire to keep track of additional enemies so that the game character is not overwhelmed. Unlike real life, where eye shifts and head turns are an almost unconscious action allowing quick attention shifts, in video games, a new focal point (e.g. target) often needs to be selected or designated. Unfortunately, if the player decides to attack one of the additional enemies, the player then may have to relinquish aim at the originally selected target, and then reacquire the initial target once the additional enemy is destroyed. Since the enemies do not often sit idly by while the player does this, rapid switching between enemies can result in losing track of a primary enemy and result in the death or destruction of the game character.

The exemplary illustrative non-limiting implementations presented herein provide examples of an improved targeting system. According to an exemplary implementation, a player can select a target for the focus of a game character's attention. Once a game target is locked-on as a focus target, some movement of the game character, for example sideways movement, then becomes rotational movement around the target, keeping the focus target generally centered in the game character's field of view. In real life, however, even if a person were fixedly looking at one object and walking a circle around it, the person could still interact with and have decent awareness of surrounding objects (e.g. secondary targets). In accordance with this "human" ability, the exemplary illustrative non-limiting implementation allows the player to target secondary objects within the game, by, for example, moving a free-moving target reticle over those secondary targets. In this way, a player can automatically keep some attention focused on a main target (e.g. a game boss) and destroy secondary targets (e.g. non boss enemies, secondary boss portions, missiles, etc.) at the same time.

Another exemplary illustrative non-limiting implementation provides for augmentation or alteration of the targeting reticle when it passes over a targetable object. Since games are often created in fantastic and fictional environments, it may not always be clear to a player what needs to be shot or destroyed in a given scene. For example, it may be obvious that the giant robot in the room is the boss target (and thus it may be advisable to select this as a lock-on target), but it may not be apparent that the armor plating needs to be knocked off of the robot's legs, then the legs need to be disabled, and then the boss can be destroyed. Or perhaps the boss has secondary targets that don't need to be shot, but that can be destroyed for an easier fight. For example, maybe the boss has a radio antenna that allows him to "summon" secondary enemies. If destroyed, the secondary enemies will stop coming. While it may be possible to kill the boss without destroying the antenna, the fight may be easier if the secondary enemies are not present. Thus, a player may wish to destroy the antenna but not know that this is an option. And, since the antenna may take more than one shot to destroy, a test shot or two into an antenna may have limited or no visible results, thus discouraging a player from focusing attention on that target. Accordingly, in this illustrative exemplary non-limiting implementation, when the target reticle passes over one of these secondary targets of opportunity, the reticle is altered so that the player knows that he/she has targeted something worth shooting. This alteration may be, for example, a color change, a size change, a form change, or any other suitable modification.

BRIEF DESCRIPTION OF THE DRAWINGS

The file of this patent contains at least one drawing executed in color. Copies of this patent with color drawing(s)

will be provided by the Patent and Trademark Office upon request and payment of the necessary fee.

DETAILED DESCRIPTION OF EXAMPLE EMBODIMENTS

Figure 1:
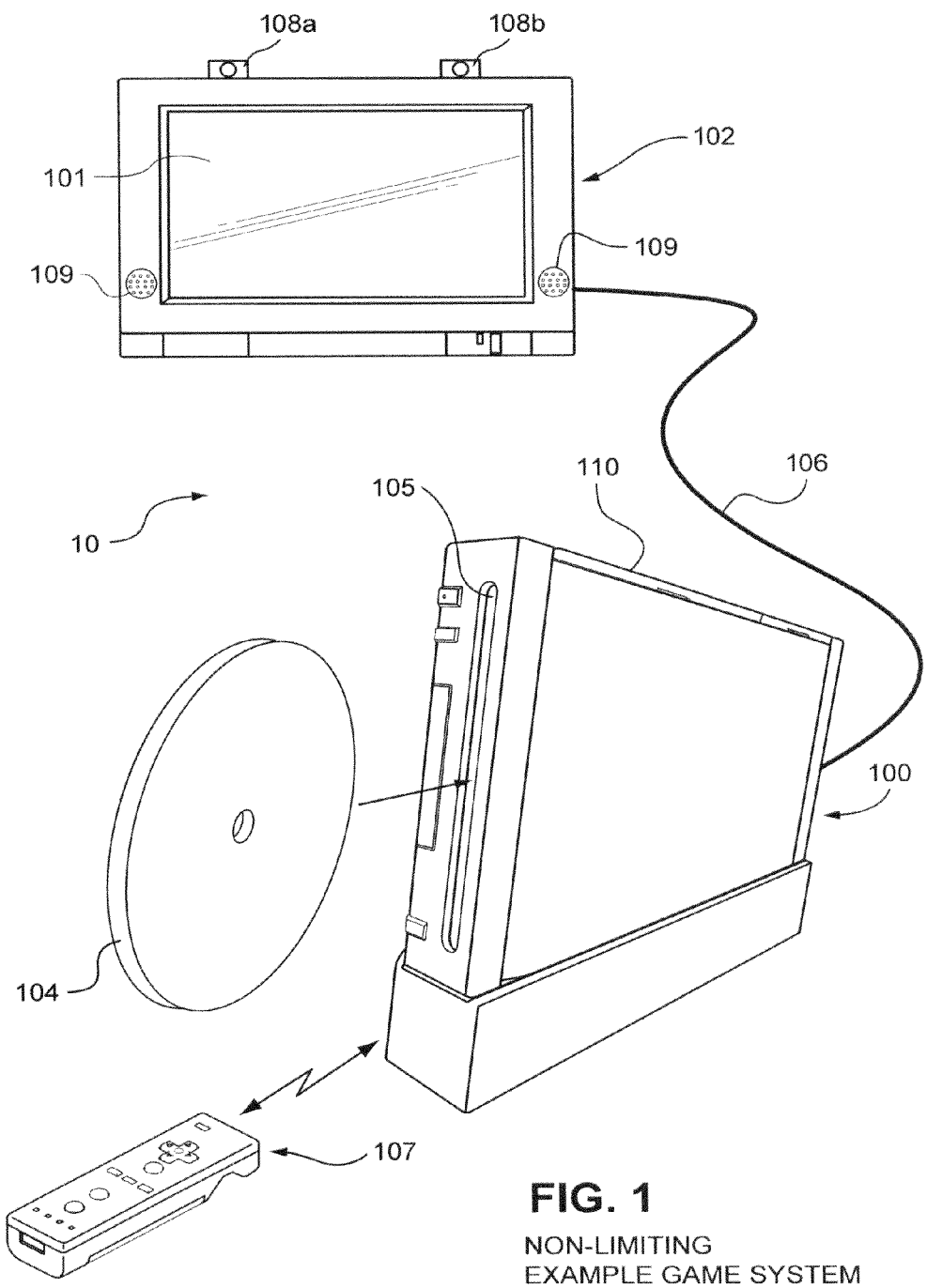
FIG. 1 is a diagram of an example illustrative non-limiting game system.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a direction key and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 102, they may also be positioned in other locations, such as below television 102. In one implementation, a center point between light-emitting devices 108a and 108b is substantially aligned with a vertical centerline of television 102. The light from light-emitting devices 108a and 108b can be used to determine a direction in which controller 107 is pointing as well as a distance of controller 107 from display 101. By way of example without limitation, light-emitting devices 108a and 108b may be implemented as two LED modules (hereinafter, referred to as "markers") provided in the vicinity of a display screen of television 102. The markers each output infrared light and the imaging information calculation section of controller 107 detects the light output from the LED modules to determine a direction in which controller 107 is pointing and a distance of controller 107 from display 101 as mentioned above. As will become apparent from the description below, various implementations of the system and method for lock-on target tracking with free targeting capability described herein do not require use such markers.

Figure 2:
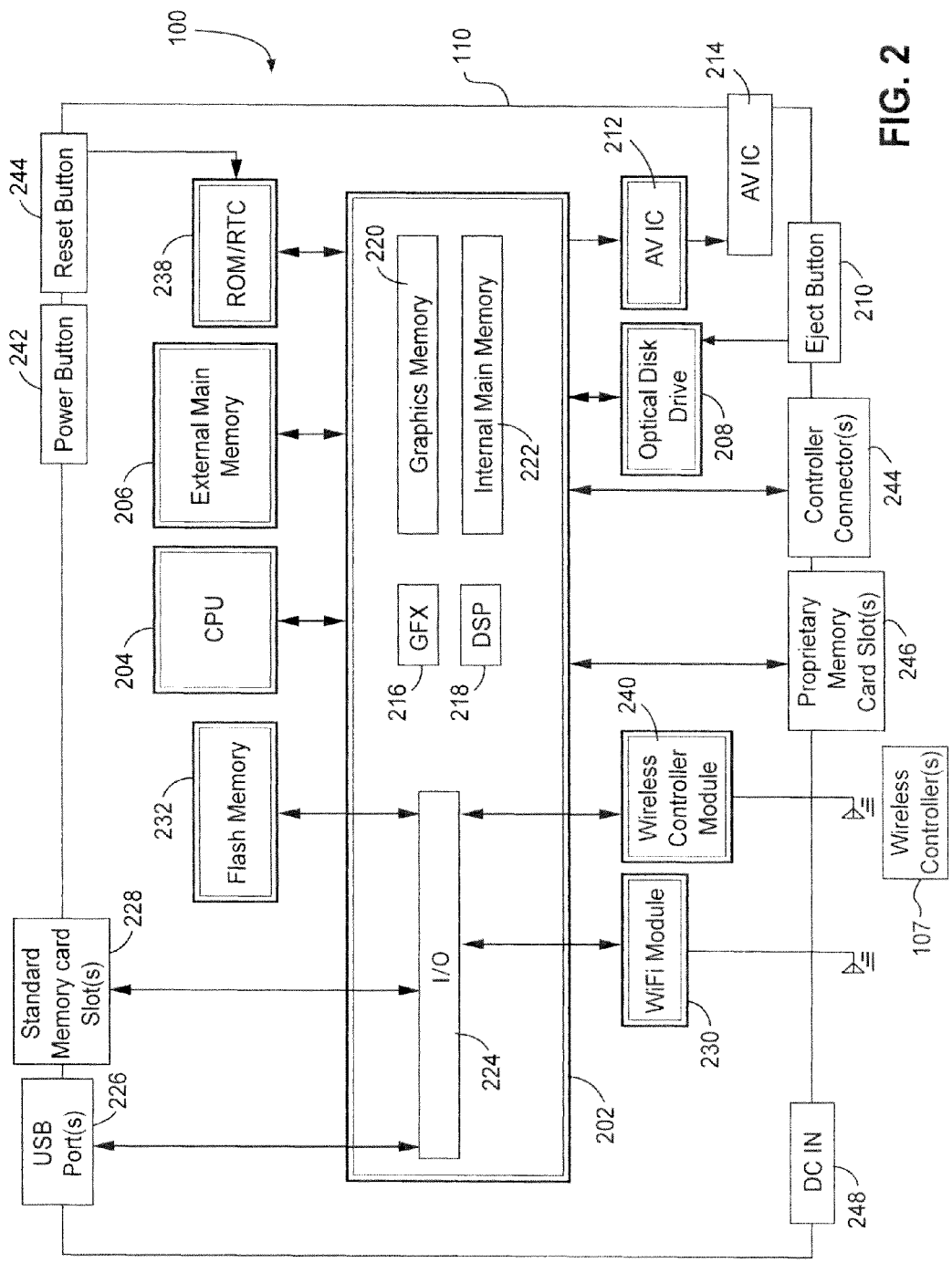
FIG. 2 is a block diagram of example game system shown in FIG. 1.

With reference to the block diagram of FIG. 2, game console 100 includes a RISC central processing unit (CPU) 204 for executing various types of applications including (but not limited to) video game programs. CPU 204 executes a boot program stored in a boot ROM (not shown) to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertent turn-off. Reset button 244 is used to reset (re-boot) game console 100.

Figure 3A:
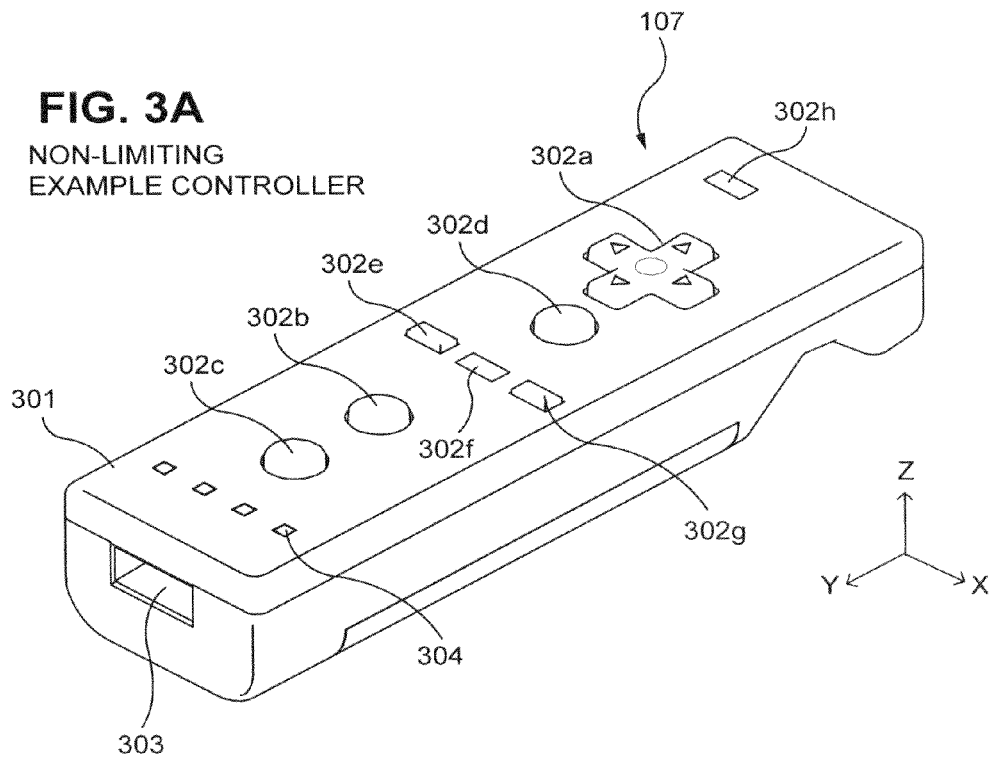
FIGS. 3A and 3B are perspective views of a top and a bottom of example controller shown in FIG. 1.
Figure 3B:
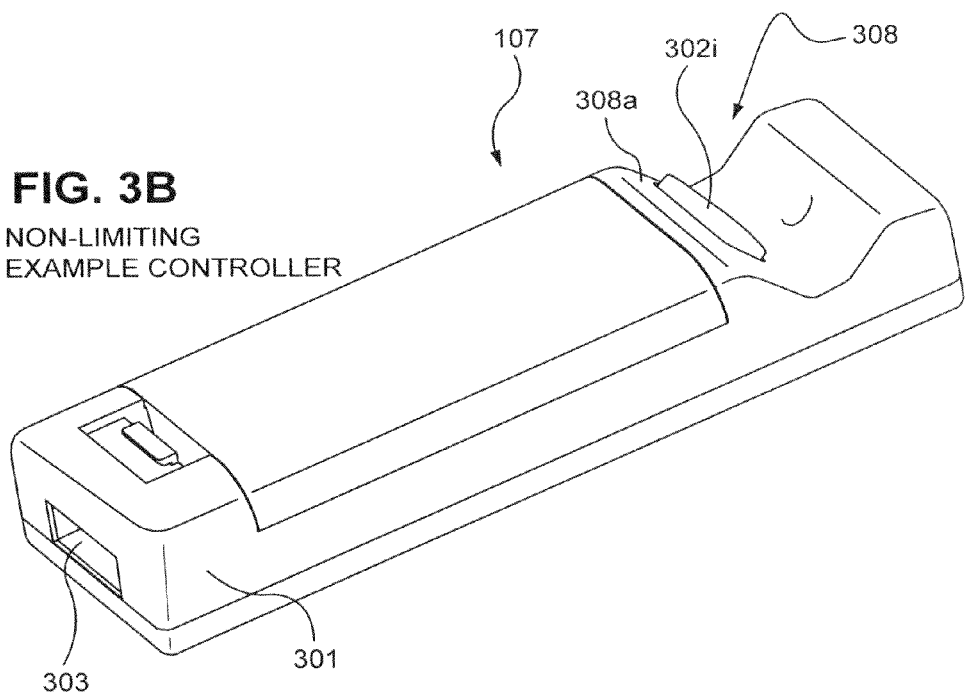
Figure 4:
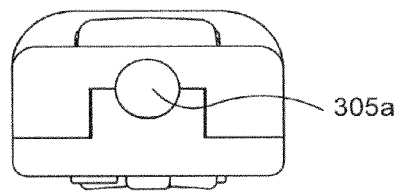
FIG. 4 is a front view of example controller shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively a "1" button, a "2" button and an "A" button and buttons 302e through 302g are respectively a "+" key, a menu switch, and a "−" key, for example. Generally, buttons 302b through 302g are assigned various functions in accordance with the application being executed by game console 100. In an exemplary arrangement shown in FIG. 3, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as a "B" button which can be used, by way of illustration, as a trigger switch in a shooting game.

As shown in FIG. 4, an imaging element 305a is provided on a front surface of controller housing 301. Imaging element 305a is part of an imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. Additional details on imaging information calculation section 305 may be found in Application Nos. 60/716,937, entitled "VIDEO GAME SYSTEM WITH WIRELESS MODULAR HANDHELD CONTROLLER," filed on Sep. 15, 2005 (corresponding to U.S. Patent Publication No. 2007-0066394 A1); 60/732,648, entitled "INFORMATION PROCESSING PROGRAM," filed on Nov. 3, 2005 (corresponding to U.S. Patent Publication No. 2007-0072674 A1); and application No. 60/732,649, entitled "INFORMATION PROCESSING SYSTEM AND PROGRAM THEREFOR," filed on Nov. 3, 2005 (corresponding to U.S. Patent Publication No. 2007-0060228 A1). The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5:
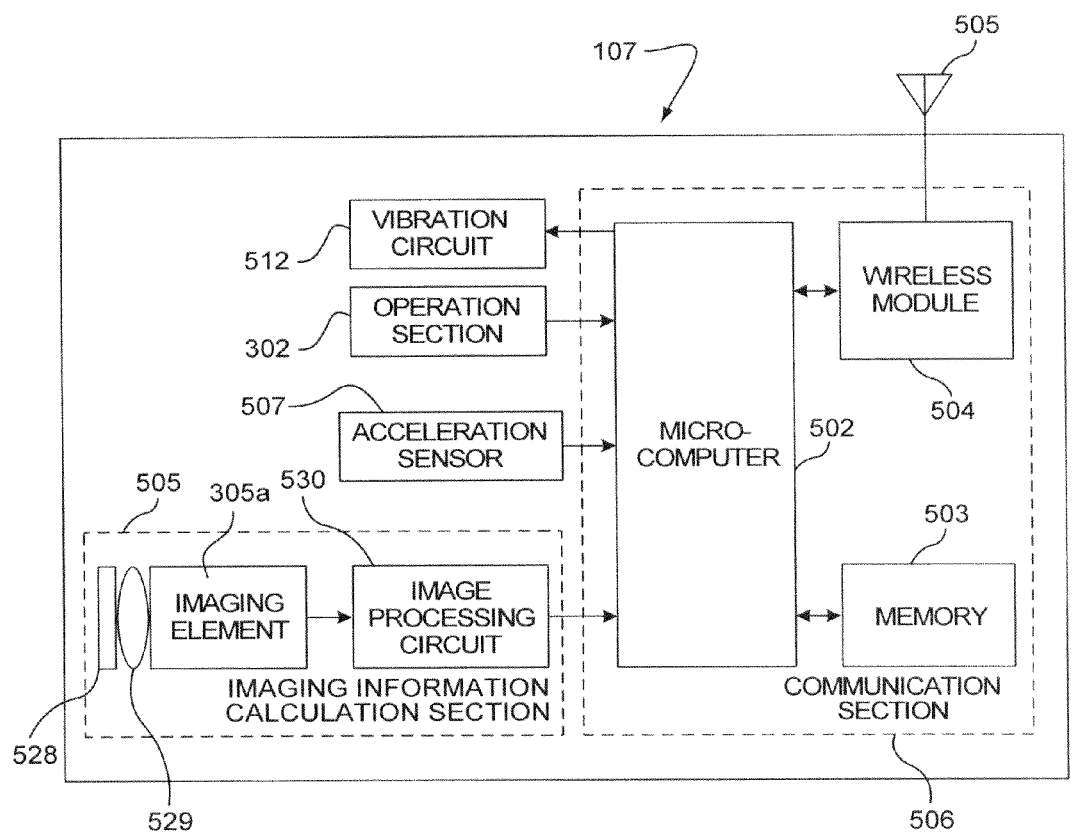
FIG. 5 is a block diagram of example controller shown in FIG. 1.

As shown in the block diagram of FIG. 5, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis may be used or a one-axis linear accelerometer that only detects linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 507 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, image information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 530 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of ⅙₀ sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

EXAMPLE TARGETING

Figure 6:
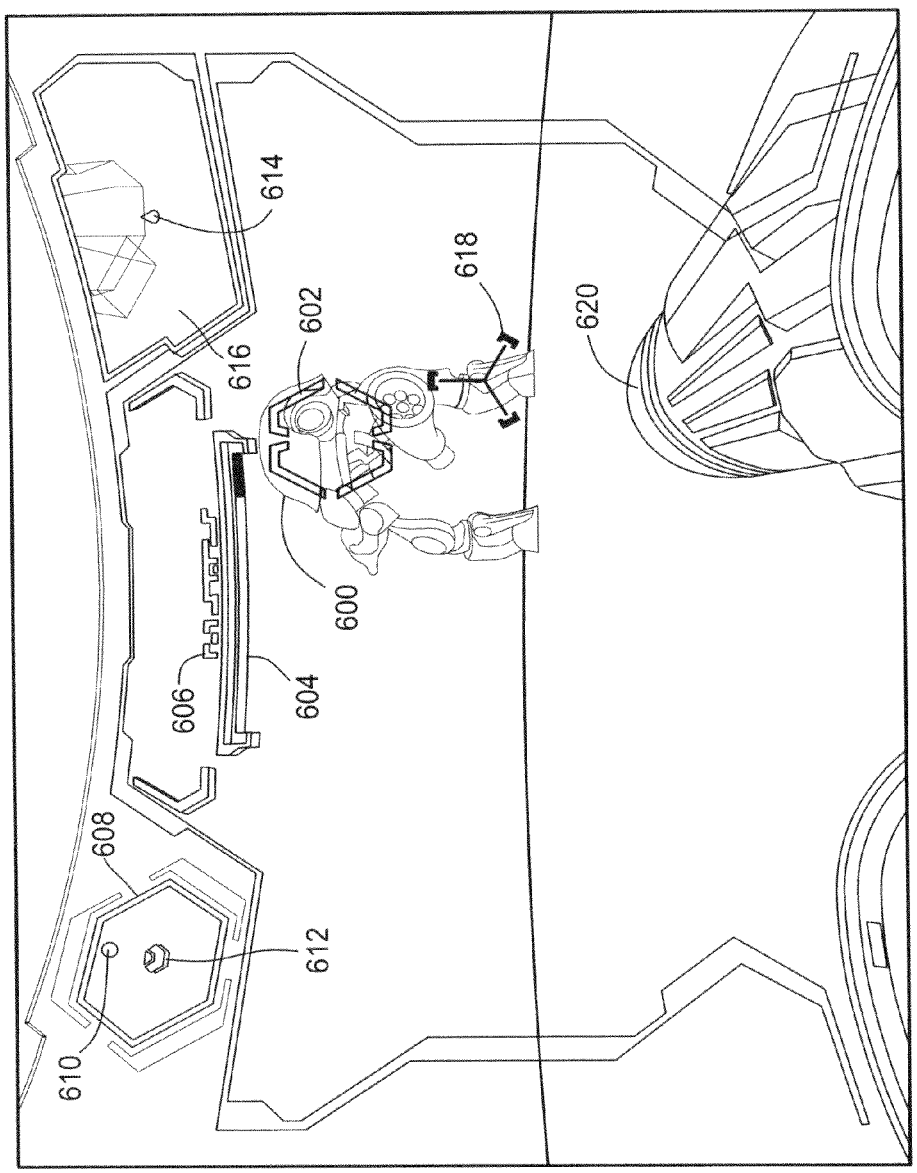
FIG. 6 shows an exemplary first person perspective of a game environment in which a player is freely targeting enemies.

FIG. 6 shows an exemplary first person perspective of a game environment. In this exemplary illustrative non-limiting implementation, the game environment is seen through a game character's helmet face-plate. Projected on the face-plate is a radar screen 608, showing character position and orientation 612 and enemy position 610. In the upper right corner of the screen is a map 616 showing character location.

An enemy 600 is shown slightly off center. In this illustrative implementation, the player has not yet locked-on to the enemy robot. A target indicator, 602, is displayed so that the player can easily see that this is a potential target for lock-on, but the character is still moving freely (i.e. in directions corresponding to joystick directions) in the gamespace. A targeting reticle 618 is aimed at an enemy's leg and a health bar 604 is displayed over the enemy's head. The character's weapon 620, tracks where the target reticle is aimed.

Also, in this illustrative implementation, the player is provided with at least one motion sensitive controller having a CCD camera therein. The controller detects relative movement and thus can move the target reticle to any place designated by the player moving the controller.

Figure 7:
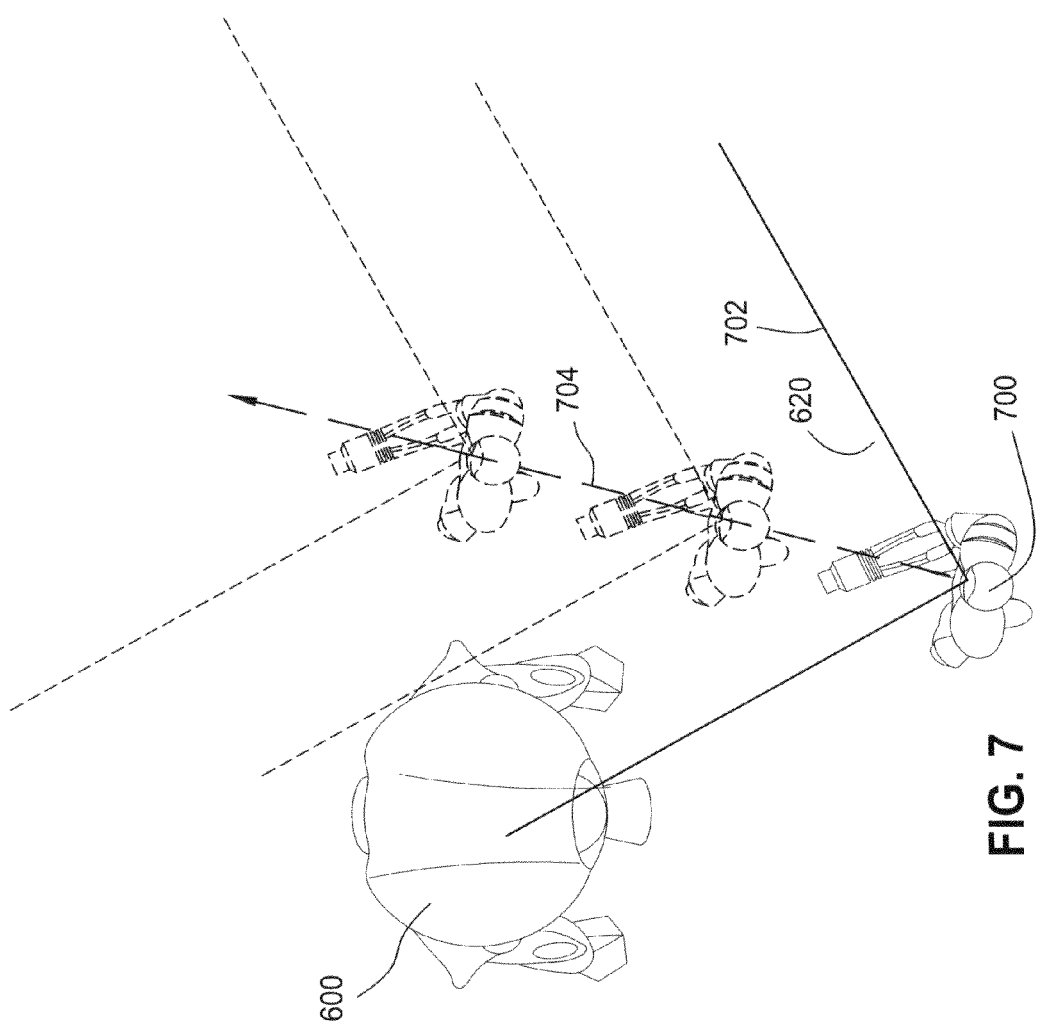
FIG. 7 shows an exemplary overhead view of a game character and an enemy.

FIG. 7 shows an exemplary overhead view of a game environment with a character 700 and an enemy 600. The character 700 is in a free aiming mode, which means the player has not locked-on to the enemy 600. In this mode, the character 700 moves in, for example, the corresponding direction to which a controller key or joystick was pushed (i.e. forward to move forward, etc.). The character's field of view 702 is also some area in front of the character. As the character moves along the line 704, the enemy 600 passes out of the character's field of view 702. If this were a game being played at a rapid speed with a multitude of enemies, the player might have a hard time moving character 700 around and keeping enemy 600 in a field of view. At the same time, it may be desirable to allow a player to have this free-motion control so that he can position the character in a proper spot for an attack (e.g. behind cover, up on a ledge, etc.).

Figure 8:
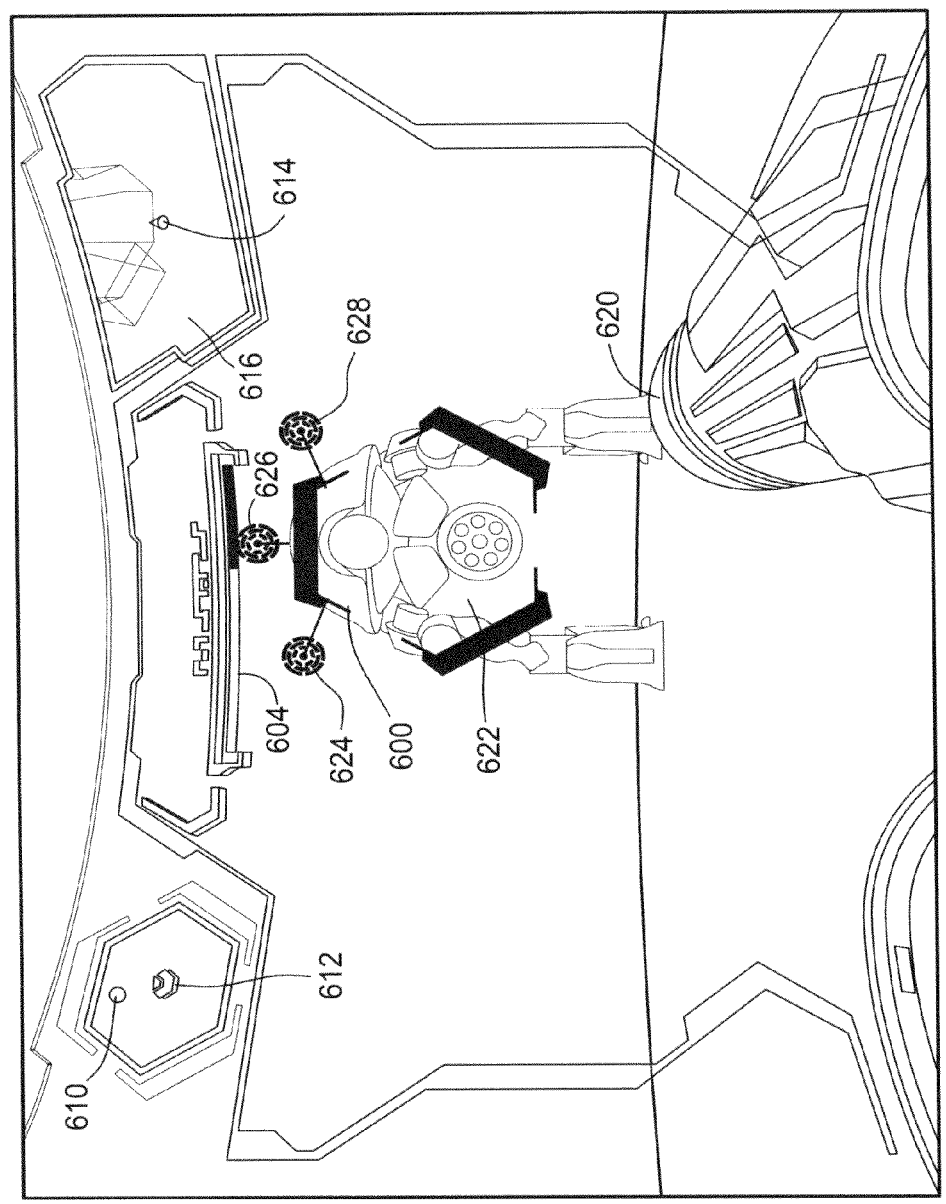
FIG. 8 shows an exemplary first person perspective of a game environment in which a player has locked-on to a focus target enemy.

FIG. 8 shows an exemplary first person perspective of a game environment in which a player has locked-on to a target enemy 600. In this exemplary illustrative non-limiting implementation, the player is initially aiming a weapon 620 at the enemy which is locked-on to. This aiming may be an automatic function, or it may result from the player having to have targeted area 602 (shown in FIG. 6) to obtain the lock-on. The character's view may also be slightly adjusted so that the enemy is generally in the center of the screen once it is locked on to.

In this exemplary implementation, the enemy is a large robot 600 having three antennae 624, 626, 628. To let the player know that the lock-on was successful, the shape of the target indicator graphic 602 (shown in FIG. 6) has changed to graphic 622 designating the locked target. This change could also be a color change, with or without shape change, or some other designator.

Also, in this exemplary implementation, the player has depressed a specific key to instruct a lock-on. The lock-on could remain, for example, until the player releases the key, until the key is depressed again, or until a different key is pressed. Destroying the target may also remove the lock-on.

As long as the player does not begin a free-aiming mode, moving a targeting reticle (not shown here) away from the locked-on target, the character's weapon 620 and view will remain aimed at the locked on area. This allows the player to focus on moving and shooting without having to constantly adjust a camera view or re-target the enemy.

Figure 9:
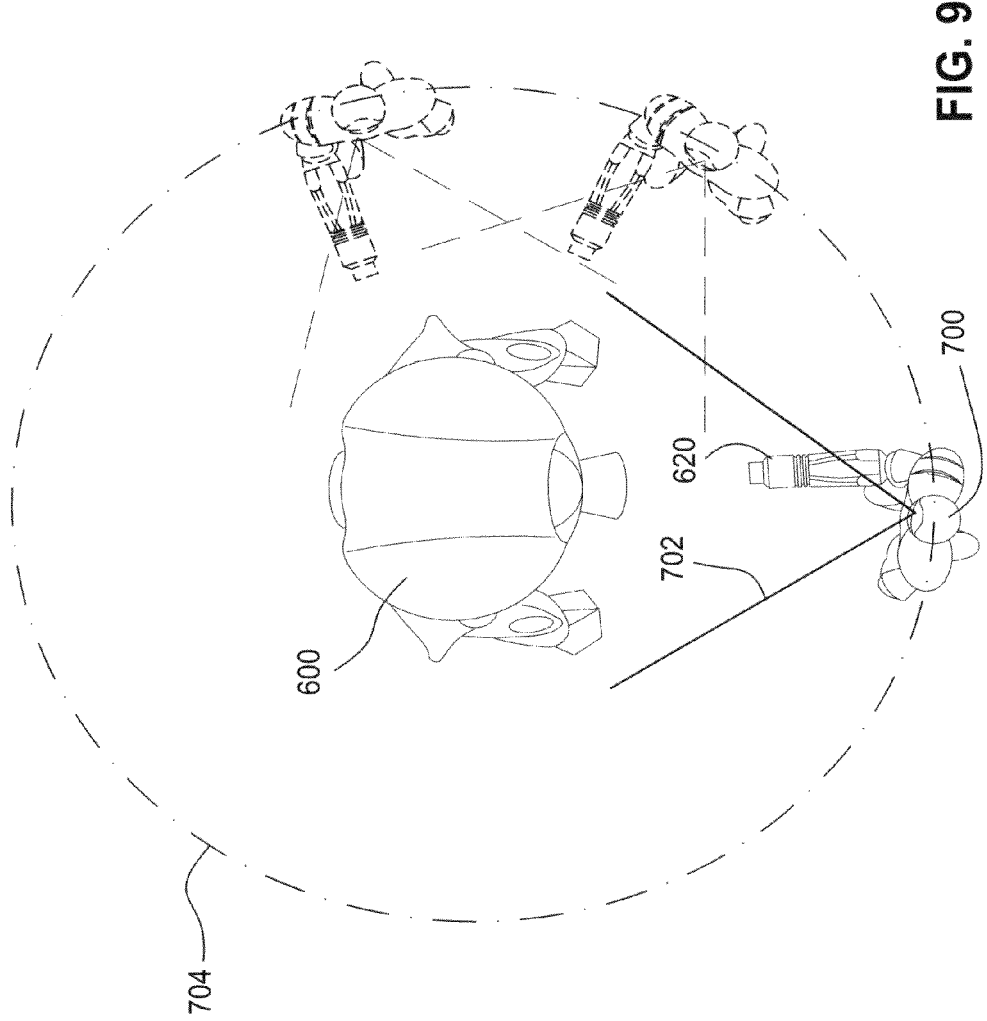
FIG. 9 shows an exemplary overhead view of a game character and an enemy when the character is in a lock-on mode.

FIG. 9 shows an exemplary overhead view of a game environment in which a player has locked-on to an enemy 600. The character 700 can still freely move forwards and backwards in this exemplary implementation, but when sideways movement is instructed the character begins to move in a circle 704 around enemy 600. This allows the character 700 to remain facing the enemy 600 and to keep the weapon 620 aimed at the enemy 600. As the character 700 moves, the enemy 600 remains substantially in the center of the character's field of view 702.

Figure 10:
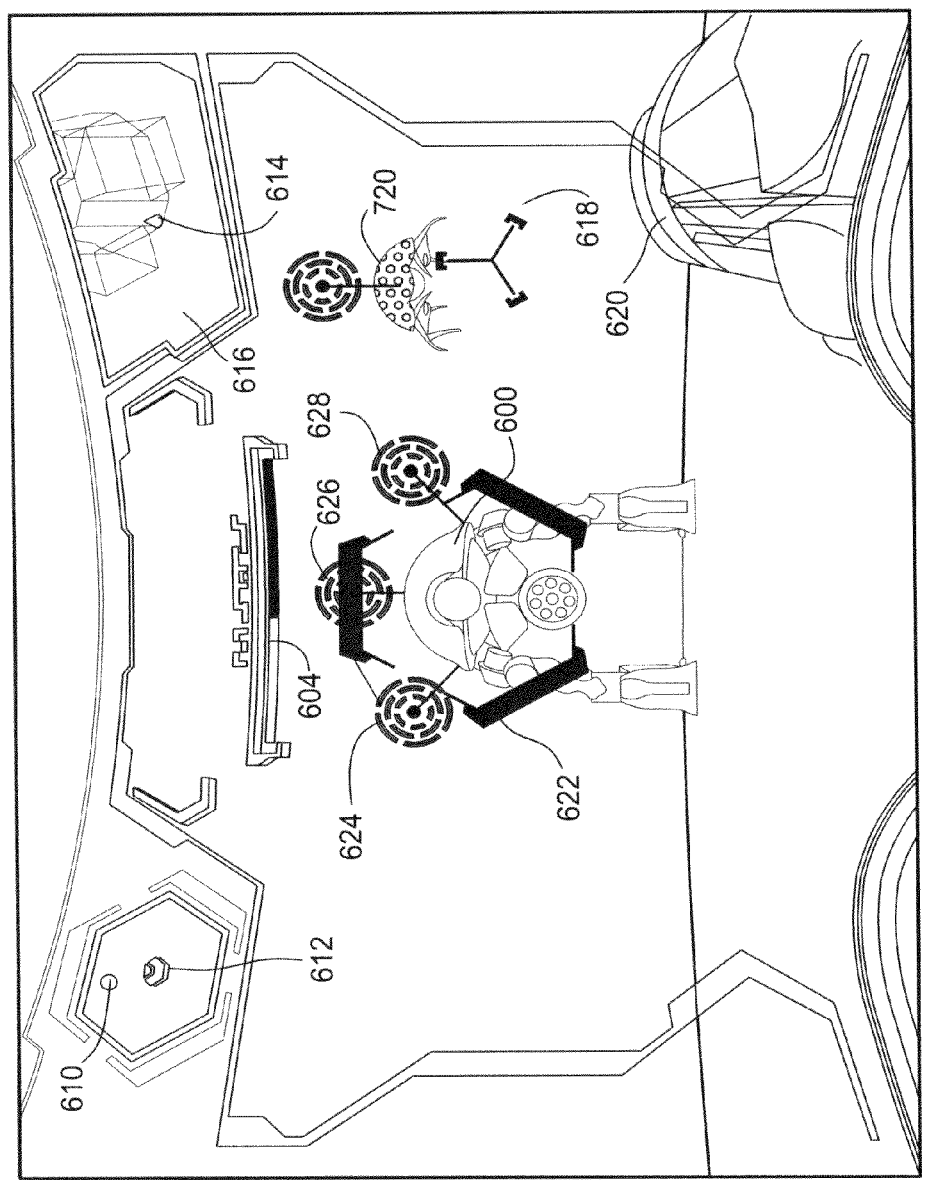
FIG. 10 shows an exemplary first person perspective of a game environment in which a player has locked-on to a focus target enemy and is free-aiming.

FIG. 10 shows an exemplary first person perspective of a game environment in which an enemy 600 is locked-on to and has summoned a drone 720. In order to eliminate the drone 720, the player has gone into a free-targeting mode, but has left the enemy 600 in a locked-on mode.

According to this exemplary illustrative non-limiting implementation, movement works the same as described with respect to FIGS. 8 and 9. The player can move the character in a circle around enemy 600 and keep the enemy 600 in the field of view. But, since the player is now in a free targeting mode, targets other than the enemy 600 can be shot.

For example, in this exemplary implementation, the player has moved the target reticle 618 towards the drone 720. Lock on graphic 622 still designates the locked target 600, but the player is preparing to shoot the drone 720. The weapon 620 follows the reticle 618 and is almost aimed at the drone 720. This way, the player maintains a focus on and keeps track of the main (and likely most dangerous) selected enemy 600, but can also eliminate additional enemies that are on or come onto the screen.

In this exemplary implementation, the player is provided with a motion sensitive controller, so merely moving the controller to the right would be sufficient to target the drone. Secondary targeting can also be performed by any other appropriate method.

Figure 11:
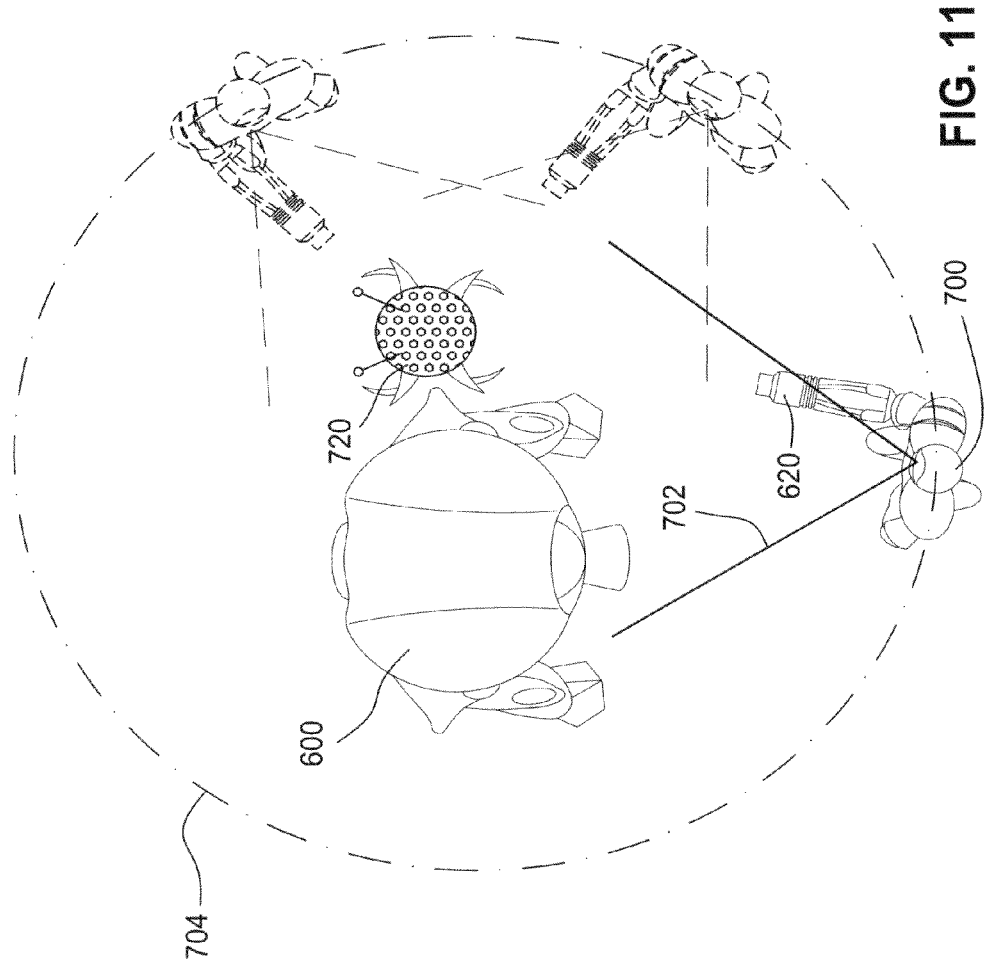
FIG. 11 shows another exemplary overhead view of a game character and an enemy when the character is in a lock-on mode.

FIG. 11 shows an exemplary overhead view of a game environment containing an enemy robot 600, an enemy drone 720, and a game character 700. In this exemplary illustrative non-limiting implementation, the player has locked-on to the enemy robot 600 but is aiming in the direction of the drone 720. The character's weapon 620, is aimed at the drone 720, and not the robot 600.

As the character moves in a circular motion around the robot 600 along path 704, the robot stays substantially in the center of the character's viewfield 702, but the drone 720 is visible in this example as well. If the drone 720 had moved out of the character's viewfield 702, the player may have to relinquish the lock to track the drone 720, or the player can ignore the drone 720 and refocus aim on the robot 600. Once the drone 720 is destroyed, the player can easily retarget the main enemy 600, since that enemy 600 has always remained in the character's viewfield 702.

Figure 12:
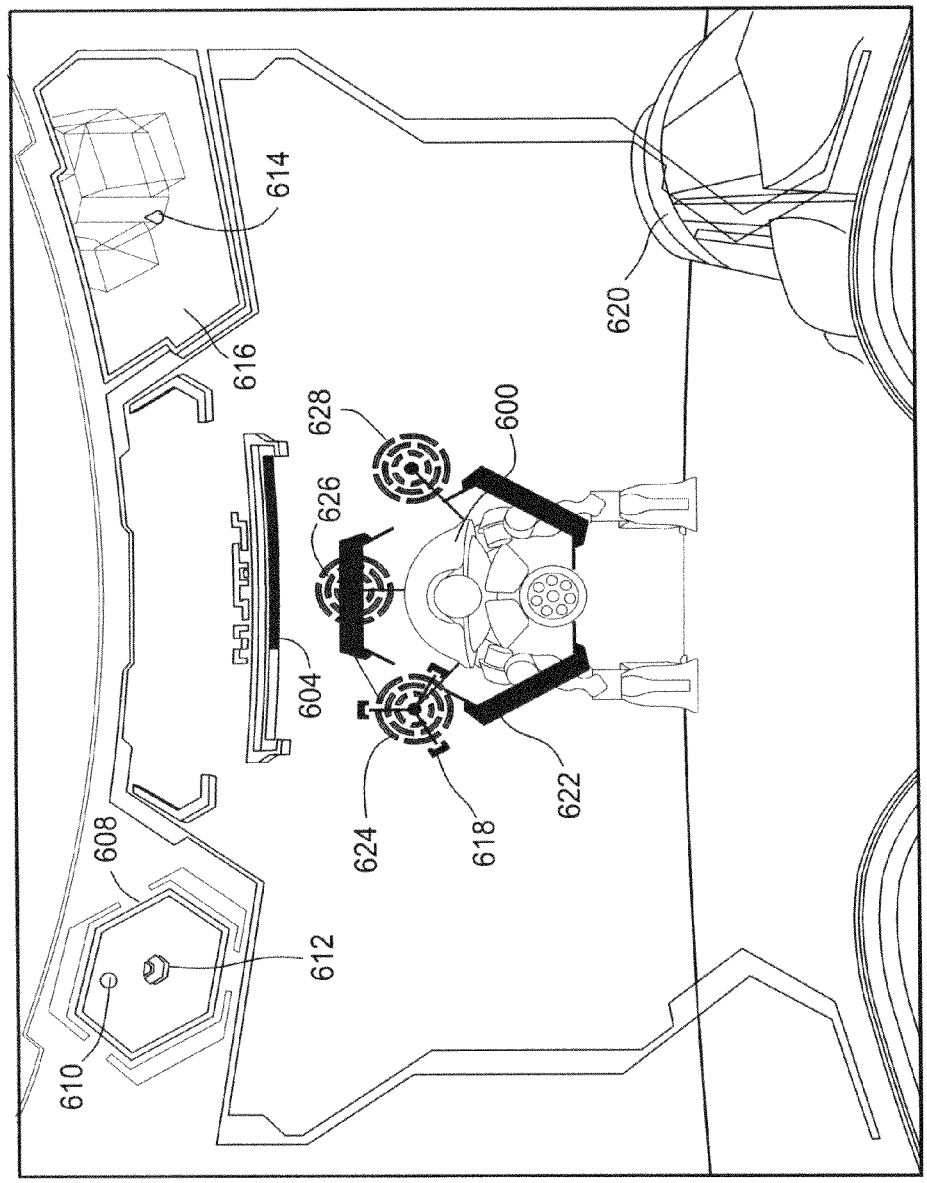
FIG. 12 shows an exemplary first person perspective of a game environment in which a player has locked on to a focus target enemy and has freely targeted a secondary target.

FIG. 12 shows an exemplary first person view of a game environment in which a player has locked-on to a main target 600 and is free-targeting a secondary target 624. In this exemplary illustrative non-limiting implementation, the player is attempting to destroy secondary targets 624, 626, 628 which are part of a main target 600 before the player attacks the main target directly. Destruction of these targets 624, 626, 628 may prevent the main target 600 from calling for help, or they may lower a shield allowing the player to attack the main target 600 directly, etc.

Since the main target is likely an object with which the player is unfamiliar (i.e. it doesn't actually exist), the player may be unsure as to what, if any, secondary targets can or need to be destroyed. While the player can be "briefed" on the target by the game, the player may not remember the correct information once the enemy 600 is engaged.

In this exemplary illustrative non-limiting implementation, the reticle 618 changes color as it passes over secondary targets 624, 626, 628, which can be shot by the player. Here, when the player targets an antenna 624, the reticle 618 changes from green to red, indicating that the player can shoot this target and have some effect. More than one color could also be used, for example, one color for necessary secondary targets and one color for optional secondary targets (for higher points, bonus items, things that can only be destroyed with, for example, missiles, etc.). This also encourages the player to target different areas of an enemy, adding to the fun of the game. Although the change was described in terms of a color change, it could also be a shape change or any other suitable distinguishable alteration.

Figure 13:
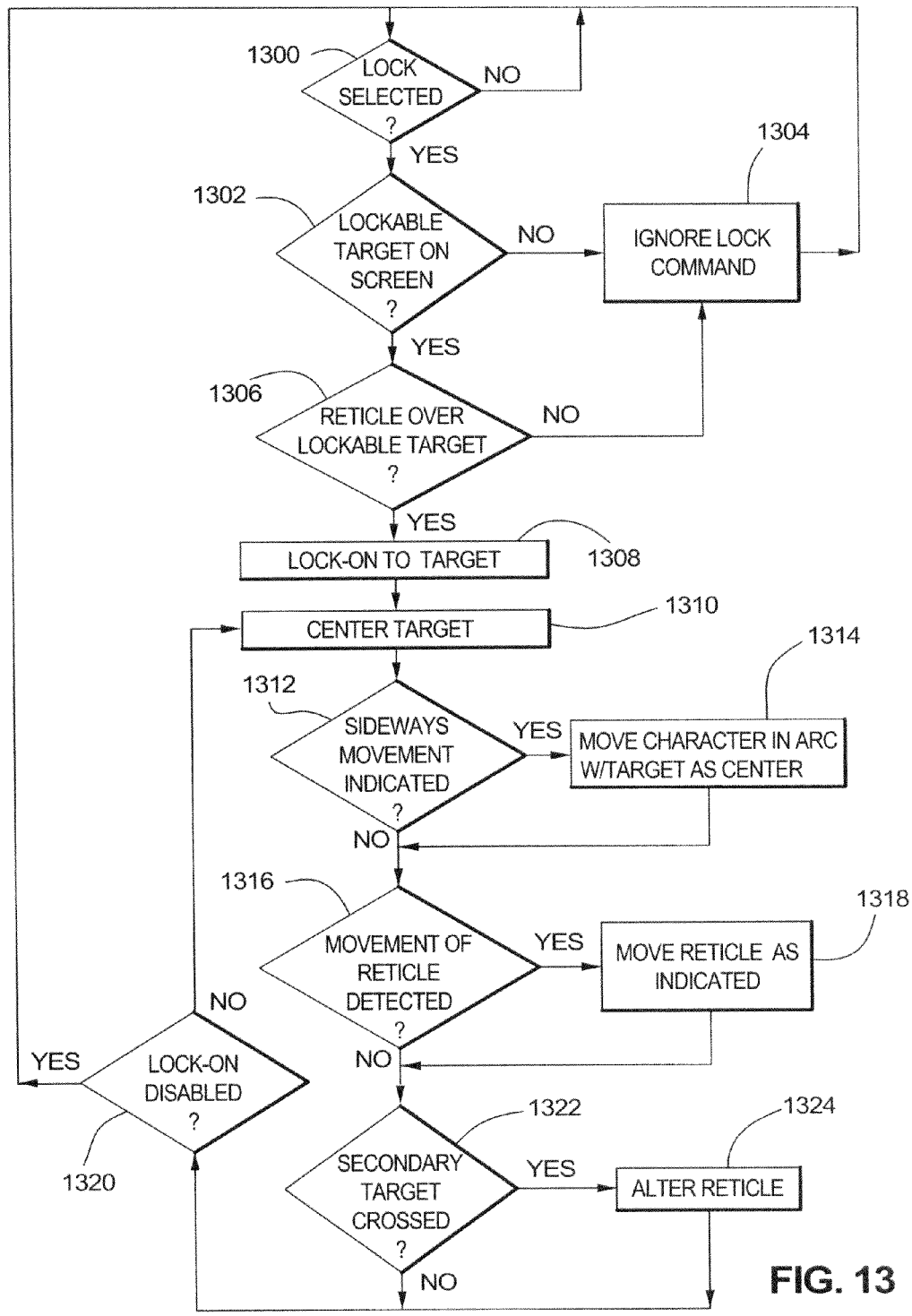
FIG. 13 shows an exemplary game flow for a target lock and gameplay while lock-on is enabled.

FIG. 13 shows an exemplary game flow for a target lock and game play while lock-on is enabled. Initially, the game may check to see if lock-on has been selected (step 1300). If lock on is not selected, the game may continue as normal, including repeatedly detecting whether lock-on is selected.

If a target lock-on has been selected, the game may then determine whether a lockable target is onscreen (step 1302). If there is no lockable target onscreen, the game may ignore the lock command (step 1304) and return to checking for lock commands. The game could also possibly show the user some message indicating why a lock did not occur.

If there is a lockable target onscreen, the game may then check to see if a reticle is over a lockable target (step 1306). In one exemplary illustrative non-limiting implementation, a target can only be locked-on to if it has the reticle aimed at it by the player. Thus, the player must bring a weapon in-line with the target in order to lock-on to it. Of course, lock-on could also be achievable without this step.

If the reticle is over the target, then the game may proceed to lock-on to the selected target (step 1308) and center the selected target in the character viewfield (step 1310).

Once the target is locked-on to, the game may detect if a sideways movement is indicated (step 1312). According to this exemplary illustrative non-limiting implementation, sideways movement corresponds to rotational movement about a target in lock-on mode. Other movement could also be designated to control this rotation. If sideways movement is selected, the character is moved in an arc around the central target, always facing the target (step 1314).

The game may also determine whether movement of a target reticle is detected (step 1316). If the target reticle is moved, then the focus will stay on the locked-on target, but the reticle will be moved in the indicated direction (step 1318), such as over a secondary target.

Additionally, if a secondary target is crossed by a moved reticle (step 1322) the reticle may be altered to indicate the presence of a secondary target (step 1324). Otherwise the game may proceed to a step to determine if the lock-on mode is still enabled (step 1320). If the mode is still enabled, the game may return to step 1310 and re-center the target. If the mode has been disabled, normal game play will resume and the game will begin detecting for lock-on enabling again.

Figure 14A:
FIGS. 14A-D shows exemplary illustrative screen shots of a game using the exemplary targeting system.
Figure 14B:
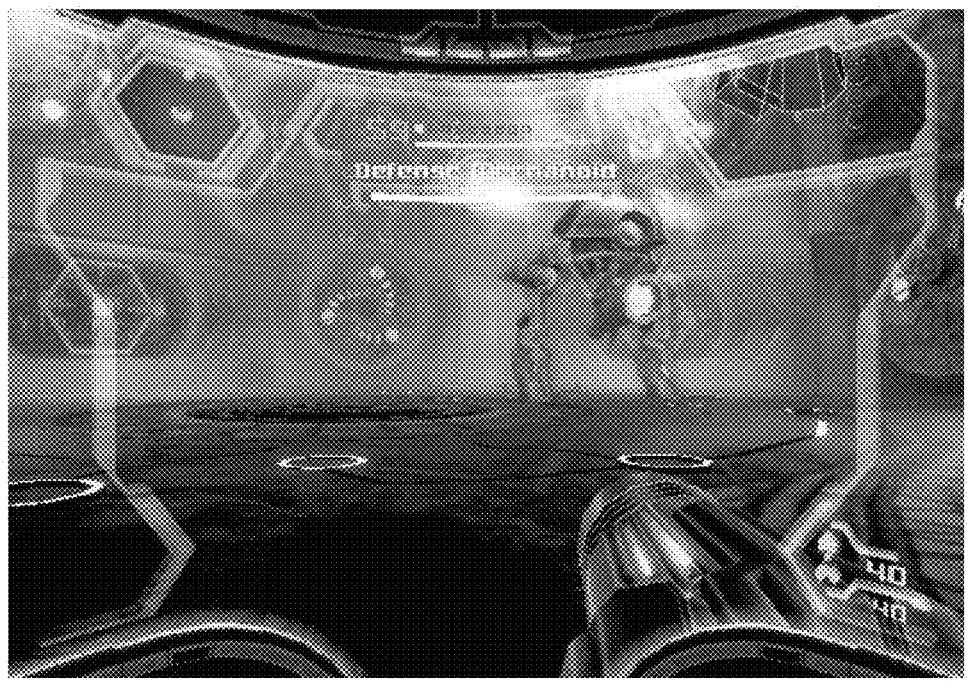

FIG. 14A shows an exemplary screenshot of a game using the targeting system. In FIG. 14A, the player has locked a view onto the enemy robot, but is still freely targeting with the reticle. The locked-on view is indicated by the large read triangular indicator surrounding the robot. As long as lock-on is maintained, the player will continue to face the enemy. The smaller target reticle is also red, because it is positioned over a target of opportunity, in this case, the antenna. In FIG. 14B, the player has released lock-on. The player can now look freely around the screen. The reticle remains red in this view, because it is over another target of opportunity, the robot's leg.

Figure 14C:
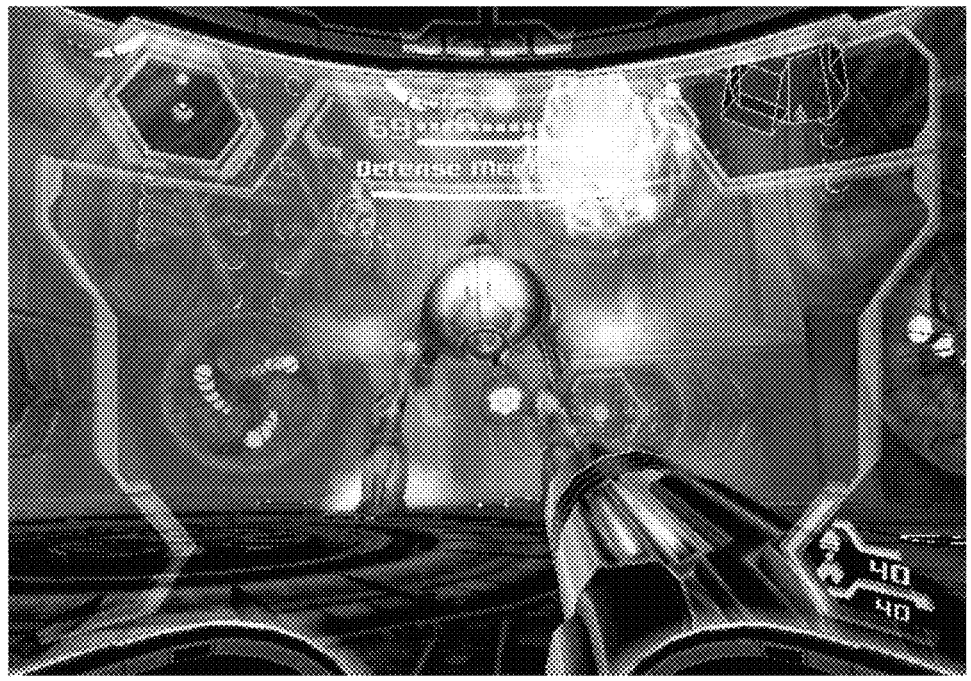
Figure 14D:
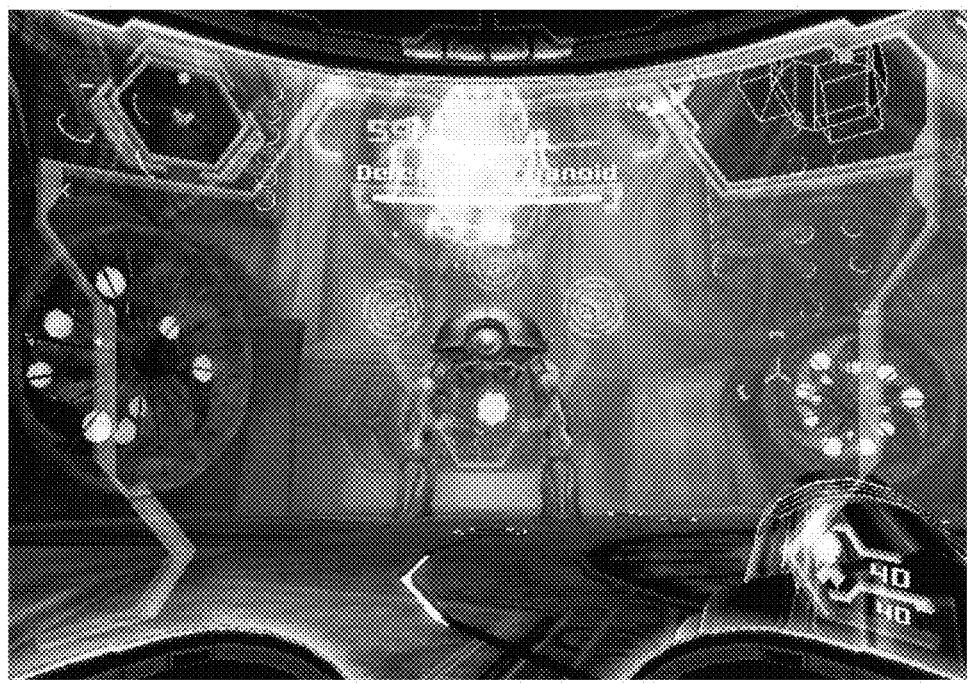

FIG. 14C shows the player locked-on and the target reticle having vanished, this is because the player's aim and viewpoints correspond, that is, the player is aiming at the area indicated by the triangular indicator. The reticle will only reappear if the player aims elsewhere in the scene. Finally, in FIG. 14D, the player is still locked on to the robot, but the player is now aiming away from the robot. Since there is no target where the player is aiming, the reticle has now turned green.

The systems and methods described herein may be implemented in hardware, firmware, software and combinations thereof. Software or firmware may be executed by a general-purpose or specific-purpose computing device (such as the game system described above) including a processing system such as a microprocessor and a microcontroller. The software may, for example, be stored on a storage medium (optical, magnetic, semiconductor or combinations thereof) and loaded into a RAM for execution by the processing system. Further, a carrier wave may be modulated by a signal representing the corresponding software and an obtained modulated wave may be transmitted, so that an apparatus that receives the modulated wave may demodulate the modulated wave to restore the corresponding program. The systems and methods described herein may also be implemented in part or whole by hardware such as application specific integrated circuits (ASICs), field programmable gate arrays (FPGAs), logic circuits and the like.

While the systems and methods have been described in connection with what is presently considered to practical and preferred embodiments, it is to be understood that these systems and methods are not limited to the disclosed embodiments, but on the contrary, is intended to cover various modifications and equivalent arrangements.

I claim:

1. A video game method implemented using at least one processor, comprising:
   causing the at least one processor to:
   apply a lock to a first game object in a virtual game world so that the first game object remains substantially at the center of a field of view of a game character as the game character moves within the virtual game world;
   maintain the lock on the first game object while allowing a targeting reticle to move to temporarily target one or more second game objects spatially separated from the first game object in the virtual game world, the first game object staying substantially in the center of the field of view of the game character while the lock is maintained on the first game object; and
   cause, when the targeting reticle is no longer targeting the one or more second game objects, the targeting reticle to return to the center of the field of view of the game character and to target the first game object.

2. The method according to claim 1, further comprising: changing a characteristic of the targeting reticle when the one or more second game objects are targeted.

3. The method according to claim 2, wherein the changed targeting reticle characteristic comprises color.

4. The method according to claim 2, wherein the changed targeting reticle characteristic comprises shape.

5. The method according to claim 1, wherein the locking onto the first game object comprises moving a target indicator to indicate the first game object.

6. The method according to claim 1, further comprising: providing a lock-on graphic to designate the locked-on first game object.

7. The method according to claim 1, wherein the field of view of the game character is from a first-person viewpoint.

8. A non-transitory computer-readable medium storing computer-executable instructions which, when executed by a computer, cause the computer to perform features comprising:
   applying a lock to a first game object in a virtual game world so that the first game object remains substantially at the center of a field of view of a game character as the game character moves within the virtual game world;
   maintaining the lock on the first game object while allowing a targeting reticle to move to temporarily target one or more second game objects spatially separated from the first game object in the virtual game world, the first game object staying substantially in the center of the field of view of the game character while the lock is maintained on the first game object; and
   causing, when the targeting reticle is no longer targeting the one or more second game objects, the targeting reticle to return to the center of the field of view of the game character and to target the first game object.

9. The non-transitory computer-readable medium according to claim 8, wherein the field of view of the game character is from a first-person viewpoint.

10. A video game system comprising:
    an input device; and
    a processor for generating a virtual game world for display on a display device, the processor being configured to:
    apply a lock to a first game object in a virtual game world based at least in part on first inputs supplied via the input device so that the first game object remains substantially at the center of a field of view of a game character as the game character within the virtual game world,
    maintain the lock on the first game object while allowing a targeting reticle to move to temporarily target one or more second game objects spatially separated from the first game object in the virtual game world based at least in part on second inputs supplied via the input device, the first game object staying substantially in the center of the field of view of the game character while the lock is maintained on the first game object; and
    cause, when the targeting reticle is no longer targeting the one or more second game objects, the targeting reticle to return to the center of the field of view of the game character and to target the first game object.

11. The video game system according to claim 10, wherein the field of view of the game character is from a first-person viewpoint.

12. A video game played in a game system having a processor, the video game comprising:
    a virtual game world created using the processor and comprising a video game character movable within the virtual game world and one or more game objects;
    a lock-on mechanism for locking onto a first game object in the virtual game world so that the first game object remains substantially at the center of a field of view of the game character as the game character moves within the virtual game world; and
    a targeting reticle moving mechanism for moving a targeting reticle to target one or more second game objects in the virtual game world,
    wherein the lock-on mechanism maintains the lock on the first game object while allowing the targeting reticle to move to temporarily target at least one spatially separated second game object,
    wherein the first game object is kept substantially in the center of the field of view of the game character while the lock-on mechanism maintains the lock on the first game object, and
    wherein the targeting reticle is caused to return to the center of the field of view of the game character and to target the first game object when the targeting reticle is no longer targeting the at least one second game object.

13. The video game according to claim 12, wherein the field of view of the game character is from a first-person viewpoint.

14. A video game method implemented using at least one processor, comprising:
    causing the at least one processor to:
        move a video game character within a virtual game world in response to game character movement inputs;
        apply a lock to a first game object in the virtual game world so that the first game object remains substantially at the center of a field of view of a game character as the game character moves within the virtual game world;
        maintain, via the at least one processor, the lock on the first game object while allowing a targeting reticle to move in response to targeting reticle movement inputs to temporarily target one or more second game objects spatially separated from the first game object in the virtual game world; and
        cause, when the targeting reticle is no longer targeting the one or more second game objects, the targeting reticle to return to the center of the field of view of the game character and to target the first game object,
    wherein game character movement inputs for moving the game character in a sideways direction relative to the locked-on first game object cause the game character to move in a circle around the locked-on first game object whereby the first game object remains substantially at the center of a field of view of a game character.

15. The method according to claim 14, further comprising:
    changing a characteristic of the targeting reticle when the one or more second game objects is targeted.

16. The method according to claim 14, wherein the changed targeting reticle characteristic comprises color.

17. The method according to claim 14, wherein the changed targeting reticle characteristic comprises shape.

18. The video game method according to claim 14, wherein the field of view of the game character is from a first-person viewpoint.

19. A non-transitory computer readable storage medium having stored thereon a program executed by a processor, the program comprising:
    locking onto a first game object in a virtual game world, the first game object being in a field of view of a game character;
    moving the game character in the virtual game world while keeping the first game object in a substantially same position in the field of view of the game character;
    targeting, using a targeting reticle, a second game object spatially separated from the first game object in the field of view of the game character while maintaining the lock onto the first game object, the first game object remaining in the substantially same position of the field of view of the game character; and
    causing, when the targeting reticle is no longer targeting the second game object, the targeting reticle to move to the substantially same position of the field of view of the game character and to target the first game object.

20. The non-transitory computer readable storage medium of claim 19, wherein the substantially same position of the field of view of the game character is a substantially center position of the field of view of the game character.

21. The non-transitory computer-readable storage medium according to claim 19, wherein the field of view of the game character is from a first-person viewpoint.

* * * * *